UNITED STATES PATENT OFFICE.

ANDREW POULSON, OF FARNWORTH, NEAR WIDNES, ENGLAND.

MANUFACTURE OF GELATINOUS SILICA.

1,012,911.　　　　　Specification of Letters Patent.　　Patented Dec. 26, 1911.

No Drawing.　　　Application filed December 28, 1909.　Serial No. 535,245.

*To all whom it may concern:*

Be it known that I, ANDREW POULSON, a subject of the King of England, residing at Hope House, Farnworth, near Widnes, in the county of Lancaster, England, have invented certain new and useful Improvements in the Manufacture of Gelatinous Silica; and I do hereby declare the following to be a full, clear, and exact description of the invention, such as will enable others skilled in the art to which it appertains to make and use the same.

My invention relates to an improved process for manufacturing gelatinous silica which is more economical and which produces more readily a better commercial product than the processes now in use.

In making the gelatinous silica I make a dilute solution of silicate of soda and water of the density of about 25 Twaddell, having a specific gravity of about 1.125 and containing about 12½ per cent. of sodium silicate. This solution I mix with dilute commercial hydrochloric acid of about 15 Twaddell, or 1.075 specific gravity containing about 15 per cent. of HCl., the acid being preferably very slightly in excess.

No artificial heat is needed. The mixed solution is allowed to stand and I have found that in from 24 to 36 hours gelatinization is complete.

The gelatinous silica thus formed may be broken up and washed with water to remove any uncombined solution and to dissolve out the sodium chlorid and whatever excess of acid there may be present.

Commercial silicate of soda almost always contains sodium bicarbonate or sodium carbonate.

In the manufacture of a gelatinous silica sometimes a solution of silicate of soda has been mixed with a decomposing agent, such as an acid and the salts present have been difficult or impossible to remove except by dialysis. In some cases sodium bicarbonate or sodium carbonate has been added to the solution of silicate of soda before treatment with the acid, but in all these cases there has remained intermingled with the gelatinous mass either carbon dioxid or a sodium carbonate.

Now I find that by my invention according to which I use very dilute solutions, no visible effervescing formation of carbon dioxid takes place but on the contrary any that is formed dissipates before the gelatinization is completed so that the gelatinous silica is free of it.

Sodium chlorid is present in the gelatinous mass formed according to my invention but I find that this salt is very readily removed therefrom and does not cling to or intermesh with the silica.

A distinguishing characteristic of my invention is the large amount of water present as compared with other processes for the manufacture of gelatinous silica, and this dilution appears to allow the exchange of atoms between the hydrochloric acid and the silicate of soda to be more even and to produce a more pure and homogenous mass of gelatinous silica than where more concentrated solutions are used. The reaction is gentler.

If solutions of reagents having much greater specific gravity than those which I have specified above are employed, the gelatinization of the resulting mixture occurs very much more rapidly, and as a result, the carbon dioxid formed is not given an opportunity to escape, and is entangled to a great extent in the viscous and gelatinous mass. The bubbles of carbon dioxid may be very minute, and in fact almost invisible; but their effect is to cause retention of large quantities of sodium chlorid or other salts, and consequently, it is practically impossible to remove the sodium chlorid completely no matter how often the washing with water is repeated. On the other hand, if the solutions employed are much less in density, the resulting mixture is apt to gelatinize incompletely, with the result that there is not sufficient body to the jelly to enable it to be broken up and washed freely and still retain its character of a jelly-like body.

The uses to which the product may be put are very varied. For example, it may be used for cementing asbestos fibers, in making non-organic nutritive media, for re-vivifying molding sand and for the manufacture of refractory articles such as furnace slabs.

I claim,

1. The process of making gelatinous silica which comprises mingling a solution of sodium silicate of about 1.125 specific gravity with dilute hydrochloric acid of about 1.075 specific gravity, and allowing the resulting mixture to gelatinize.

2. The process of making gelatinous silica which comprises mingling a solution of sodium silicate of about 1.125 specific gravity with dilute hydrochloric acid of about 1.075 specific gravity, allowing the resulting mixture to gelatinize, and washing out soluble substances from the gelatinous mass.

3. The process of making gelatinous silica which comprises mingling a solution of sodium silicate of about 1.125 specific gravity with dilute hydrochloric acid of about 1.075 specific gravity, allowing the resulting mixture to stand without artificial heating until gelatinization is complete, breaking up the gelatinous mass so formed and washing with water to remove soluble matter.

In testimony whereof I hereunto affix my signature in the presence of two witnesses.

ANDREW POULSON.

Witnesses:
H. WATSON,
CHAS. COVENTRY.